US009397908B2

(12) United States Patent
Wang

(10) Patent No.: US 9,397,908 B2
(45) Date of Patent: Jul. 19, 2016

(54) METHOD, APPARATUS, AND SYSTEM FOR ACQUIRING QUALITY OF SERVICE QOS CONTROL INFORMATION

(71) Applicant: Huawei Technologies Co., Ltd., Shenzhen (CN)

(72) Inventor: Molei Wang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 52 days.

(21) Appl. No.: 14/331,356

(22) Filed: Jul. 15, 2014

(65) Prior Publication Data
US 2014/0321310 A1 Oct. 30, 2014

Related U.S. Application Data

(63) Continuation of application No. PCT/CN2012/076954, filed on Jun. 15, 2012.

(51) Int. Cl.
*H04L 12/26* (2006.01)
*H04L 12/24* (2006.01)

(52) U.S. Cl.
CPC ............ *H04L 43/08* (2013.01); *H04L 41/0889* (2013.01); *H04L 41/0893* (2013.01); *H04L 41/5019* (2013.01)

(58) Field of Classification Search
None
See application file for complete search history.

(56) References Cited

U.S. PATENT DOCUMENTS

| 2010/0150003 | A1* | 6/2010 | Andreasen ............... H04L 43/08 370/252 |
| 2012/0233337 | A1* | 9/2012 | Zhou ...................... H04M 15/00 709/227 |
| 2012/0275300 | A1* | 11/2012 | Munoz de la Torre Alonso ............... H04L 41/0681 370/229 |
| 2014/0105223 | A1 | 4/2014 | Castellanos Zamora et al. |

FOREIGN PATENT DOCUMENTS

| CN | 101355438 A | 1/2009 |
| CN | 101370263 A | 2/2009 |
| CN | 101572954 A | 11/2009 |

(Continued)

OTHER PUBLICATIONS

Partial English Translation and Abstract of Chinese Patent Application No. CN101895937A, Aug. 26, 2014, 5 pages.

(Continued)

*Primary Examiner* — Ian N Moore
*Assistant Examiner* — Lakeram Jangbahadur
(74) *Attorney, Agent, or Firm* — Conley Rose, P.C.; Grant Rodolph

(57) ABSTRACT

A method, an apparatus, and a system for acquiring quality of service (QoS) control information. A policy control and charging rules function entity (PCRF) determines, according to a random algorithm, a time point in a time period from a receiving time of a request message sent by a policy and charging enforcement function entity PCEF for acquiring QoS control information to an update time of the QoS control information, as a time for the PCEF to reacquire QoS control information from the PCRF; and the PCEF reacquires QoS control information from the PCRF according to the time for reacquiring QoS control information from the PCRF that is carried in a response message returned by the PCRF, thereby avoiding execution of a QoS update by multiple PCEFs at a same time point, avoiding update message congestion, and improving an update speed of the QoS.

14 Claims, 7 Drawing Sheets

(56) References Cited

FOREIGN PATENT DOCUMENTS

| CN | 101868952 A | 10/2010 |
|---|---|---|
| CN | 101895937 A | 11/2010 |
| CN | 101902721 A | 12/2010 |
| CN | 102316600 A | 1/2012 |
| WO | 2012010183 A1 | 1/2012 |

OTHER PUBLICATIONS

Partial English Translation and Abstract of Chinese Patent Application No. CN102316600A, Aug. 26, 2014, 6 pages.
Partial English Translation and Abstract of Chinese Patent Application No. CN101370263A, Sep. 18, 2014, 48 pages.
Partial English Translation and Abstract of Chinese Patent Application No. CN101902721A, Sep. 18, 2014, 34 pages.
"3rd Generation Partnership Project; Technical Specification Group Services and System Aspects; Policy and Charging Control Architecture (Release 11)," 3GPP TS 23.203, V11.5.0, Mar. 2012, 175 pages.
Foreign Communication From A Counterpart Application, PCT Application No. PCT/CN2012/076954, English Translation of International Search Report dated Mar. 21, 2013, 3 pages.
Foreign Communication From A Counterpart Application, PCT Application No. PCT/CN2012/076954, Written Opinion dated Mar. 21, 2013, 6 pages.
Foreign Communication From A Counterpart Application, Chinese Application No. 201280000497.6, Chinese Office Action dated Jul. 28, 2014, 5 pages.
Foreign Communication From A Counterpart Application, Chinese Application No. 201280000497.6, Chinese Search Report dated Jul. 28, 2014, 2 pages.
Foreign Communication From A Counterpart Application, European Application No. 12878718.1 Extended European Search Report dated Jul. 7, 2015, 4 pages.

* cited by examiner

METHOD, APPARATUS, AND SYSTEM FOR ACQUIRING QUALITY OF SERVICE QOS CONTROL INFORMATION

CROSS-REFERENCE TO RELATED APPLICATION

This application is a continuation of International Application No. PCT/CN2012/076954, filed on Jun. 15, 2012, which is hereby incorporated by reference in its entirety.

TECHNICAL FIELD

The present invention relates to the field of communications technologies, and in particular, to a method, an apparatus, and a system for acquiring quality of service (QoS) control information.

BACKGROUND

During evolution of a communications network toward all Internet Protocol (IP), end-to-end QoS is very important for providing a service that satisfies a customer. An IP network can provide various services (such as video on demand, file downloading, and website browsing). Different services have different requirements for QoS, and charging modes are also different (for example, online charging or offline charging may be adopted, and charging may be performed according to traffic or duration). To solve the foregoing QoS-related problems, the 3rd Generation Partnership Project (3GPP) defines a policy and charging control function (PCC) architecture to meet a requirement for performing different QoS control on different services. A technical specification TS 23.203 defines the PCC architecture. Referring to FIG. 1, functions of the entities are described as follows:

Application function entity (AF): mainly defines a policy and charging control rule for a policy control and charging rules function entity (PCRF), and dynamically provides application layer session information.

PCRF: defines a corresponding policy according to limitations on network access of a user, information about an ongoing application service of the user, configuration made by a local operator, and user subscription information, and provides the policy for a policy and charging enforcement function entity (PCEF) for execution, where the policy includes: service data flow detection, QoS control, gating, flow-based charging, and the like.

PCEF: executes a policy delivered or specified by the PCRF, that is, completes detection of the service data flow, implements QoS guarantee of the service data flow, performs gating, and completes online/offline charging and functions such as triggering a session with a control plane, for example, a gateway GPRS support node (GGSN entity) in a general packet radio service (GPRS).

Functions of interfaces are described as follows:

Rx: is a reference point used by the AF to deliver information related to an application layer session, including an IP filter for identifying the service data flow, bandwidth information required by a service flow, and the like.

Gx: is a reference point used by the PCRF to dynamically control a PCC rule executed by the PCEF, and has the following functions: establishing, maintaining, and terminating an IP-connectivity access network (IP-CAN) session; requesting, by the PCEF, the PCC rule from the PCRF; providing, by the PCRF, the PCC rule for the PCEF; negotiating an IP-CAN bearer establishment mode, and so on.

Currently, with refined operation of data services, a large number of users may subscribe to a user package that controls the QoS based on time. When PCEFs simultaneously execute a QoS update, PCRF or PCEF overload may occur, which may result in update message congestion or system breakdown, or cause a delay in update of the QoS.

SUMMARY

Embodiments of the present invention provide a method, an apparatus, and a system for acquiring QoS control information, to solve a problem that when PCEFs simultaneously execute a QoS update, PCRF or PCEF overload occurs, which may result in update message congestion or system breakdown, or cause a delay in update of the QoS.

An embodiment of the present invention provides a method for acquiring QoS control information, wherein the method includes sending, by a PCEF, a request message for acquiring QoS control information to a PCRF, receiving, by the PCEF, a response message returned by the PCRF, wherein the response message carries the QoS control information and a time for reacquiring QoS control information from the PCRF, and the time for reacquiring QoS control information from the PCRF is any time point that is determined by the PCRF according to a random algorithm and is in a time period from a receiving time of the request message sent by the PCEF for acquiring QoS control information to an update time of the QoS control information, and determining, by the PCEF, that the time for reacquiring QoS control information from the PCRF arrives, and sending a request message for reacquiring QoS control information to the PCRF.

An embodiment of the present invention further provides a method for acquiring QoS control information, where the method includes receiving, by a PCRF, a request message sent by a PCEF for acquiring QoS control information, determining, by the PCRF according to a random algorithm, any time point in a time period from a receiving time of the request message sent by the PCEF for acquiring QoS control information to an update time of the QoS control information, as a time for the PCEF to reacquire QoS control information from the PCRF, and returning, by the PCRF, a response message to the PCEF, where the response message carries the QoS control information and the time for reacquiring QoS control information from the PCRF, so that the PCEF determines that the time for reacquiring QoS control information from the PCRF arrives, and sends a request message for reacquiring QoS control information to the PCRF.

An embodiment of the present invention further provides an apparatus for acquiring QoS control information, where the apparatus includes a first sending module configured to send a request message for acquiring QoS control information to a PCRF, a receiving module configured to receive a response message returned by the PCRF, where the response message carries the QoS control information and a time for reacquiring QoS control information from the PCRF, and the time for reacquiring QoS control information from the PCRF is any time point that is determined by the PCRF according to a random algorithm and is in a time period from a receiving time of the request message sent by the PCEF for acquiring QoS control information to an update time of the QoS control information, and a second sending module configured to determine that the time for reacquiring QoS control information from the PCRF arrives, and send a request message for reacquiring QoS control information to the PCRF.

An embodiment of the present invention further provides an apparatus for sending QoS control information, where the apparatus includes a receiving module configured to receive a request message sent by a PCEF for acquiring QoS control information, a determining module configured to determine, according to a random algorithm, any time point in a time period from a receiving time of the request message sent by the PCEF for acquiring QoS control information to an update time of the QoS control information, as a time for the PCEF to reacquire QoS control information from the PCRF, and a sending module configured to return a response message to the PCEF, where the response message carries the QoS control information and the time for reacquiring QoS control information from the PCRF, so that the PCEF determines that the time for reacquiring QoS control information from the PCRF arrives, and sends a request message for reacquiring QoS control information to the PCRF.

An embodiment of the present invention further provides a system for acquiring QoS control information, where the system includes an apparatus for acquiring QoS control information configured to send a request message for acquiring QoS control information to an apparatus for sending QoS control information; and the apparatus for sending QoS control information configured to return a response message to the apparatus for acquiring QoS control information, where the response message carries the QoS control information and a time for reacquiring QoS control information from the apparatus for sending QoS control information, so that the apparatus for acquiring QoS control information determines that the time for reacquiring QoS control information from the apparatus for sending QoS control information arrives, and sends a request message for reacquiring QoS control information to the apparatus for sending QoS control information.

In embodiments of the present invention, a PCRF determines, according to a random algorithm, any time point in a time period from a receiving time of a request message sent by a PCEF for acquiring QoS control information to an update time of the QoS control information, as a time for the PCEF to reacquire QoS control information from the PCRF, and the PCEF reacquires QoS control information from the PCRF according to the time for reacquiring QoS control information from the PCRF that is carried in a response message returned by the PCRF, thereby avoiding execution of a QoS update by multiple PCEFs at a same time point, avoiding update message congestion, and improving an update speed of the QoS.

DESCRIPTION OF EMBODIMENTS

To make the objectives, technical solutions, and advantages of the embodiments of the present invention clearer, the following clearly describes the technical solutions in the embodiments of the present invention with reference to accompanying drawings in the embodiments of the present invention. The embodiments to be described are merely a part rather than all of the embodiments of the present invention. All other embodiments obtained by persons of ordinary skill in the art based on the embodiments of the present invention without creative efforts shall fall within the protection scope of the present invention.

First, overall technical solutions of method embodiments of the present invention are described.

Method Embodiment 1

Figure 1:
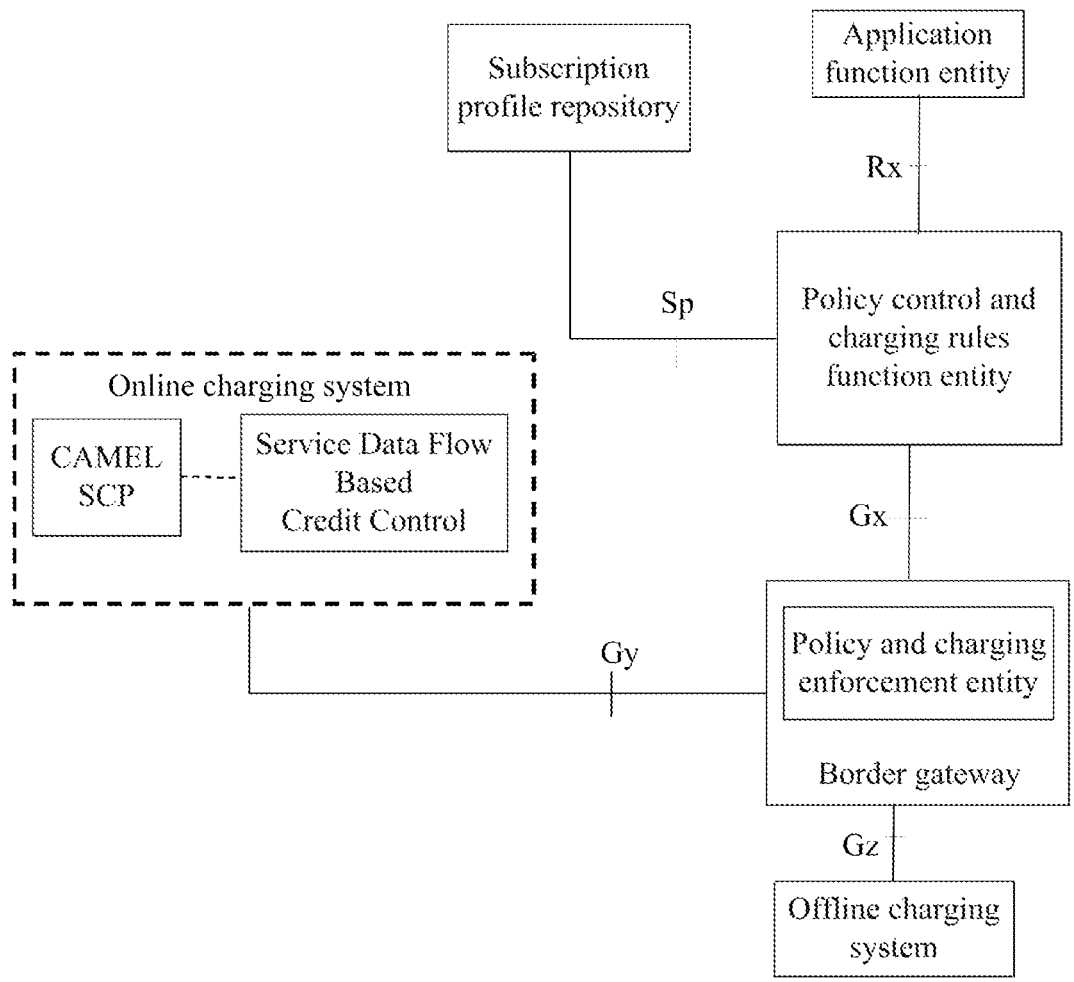
FIG. 1 is a PCC architecture in the prior art.
Figure 2:
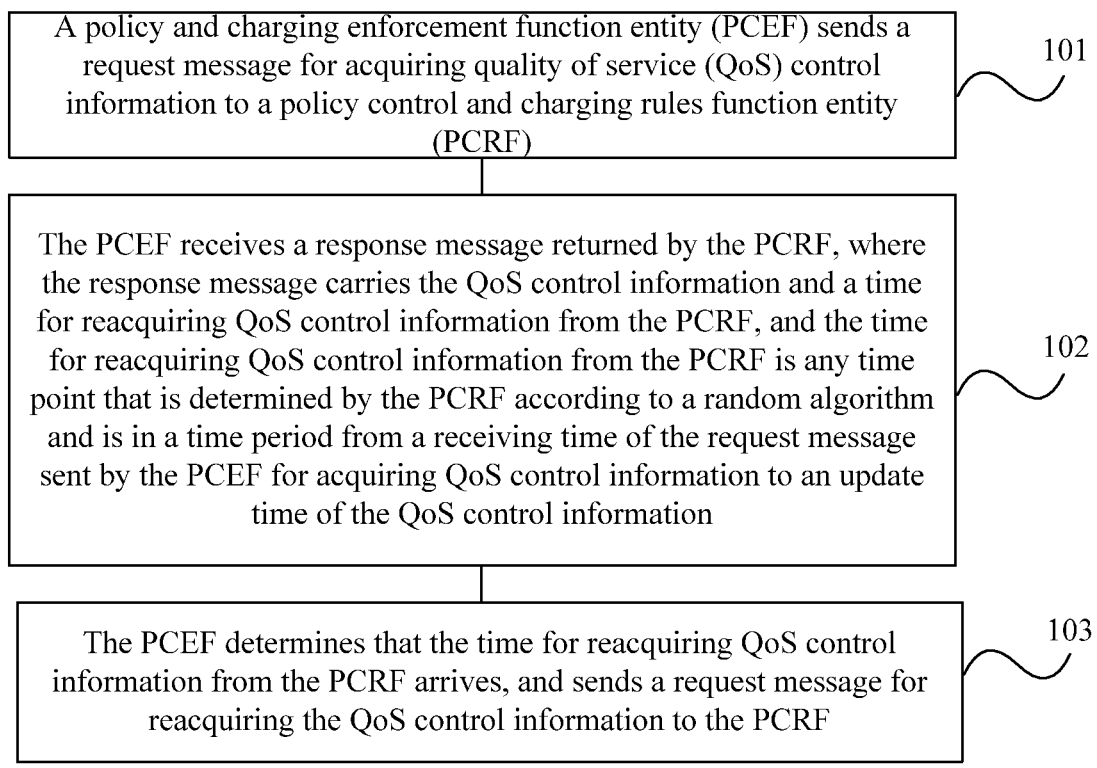
FIG. 2 is a schematic flowchart of a method for acquiring QoS control information according to an embodiment of the present invention.

FIG. 2 is a schematic flowchart of a method for acquiring QoS control information according to an embodiment of the present invention. As shown in FIG. 2, the method includes:

Step 101: A PCEF sends a request message for acquiring QoS control information to a PCRF.

In this embodiment of the present invention, the PCEF sends the request message for acquiring QoS control information to the PCRF, where the request message carries a user identity, and the user identity is used by the PCRF to determine QoS control information.

Specifically, the PCRF determines, according to the user identity, a user package subscribed to by a user, and generates the QoS control information according to the user package subscribed to by the user.

Step 102: The PCEF receives a response message returned by the PCRF, where the response message carries the QoS control information and a time for reacquiring QoS control information from the PCRF, and the time for reacquiring QoS control information from the PCRF is any time point that is determined by the PCRF according to a random algorithm and is in a time period from a receiving time of the request message sent by the PCEF for acquiring QoS control information to an update time of the QoS control information.

In this embodiment of the present invention, the PCRF pre-stores the user package, and the user package can provide the QoS control information for multiple users at the same time.

Specifically, the user package pre-stored by the PCRF may be acquired from a user subscription profile repository (SPR). The SPR stores user information and user subscription information configured by an operator for each user. The SPR transfers the pre-configured user information and user subscription information to the PCRF through a Sp interface. The PCRF may generate a user package based on the information, and the PCRF can provide different service policies for different users based on the user package.

In this embodiment of the present invention, the PCRF may determine, according to a random algorithm, any time point in a time period from the receiving time of the request message sent by the PCEF for acquiring QoS control information to the update time of the QoS control information so that the PCEF sends, at the time point, a request for reacquiring QoS control information to the PCRF, updates original QoS control information, and further executes a new QoS control policy, thereby implementing diversified QoS service.

Specifically, when receiving the request message sent by the PCEF for acquiring QoS control information, the PCRF records a time point at which the request message is received. The PCRF queries, according to the user identity carried in the request message, the user package subscribed to by the user, determines update time of the QoS control information according to update time of QoS control information of the user package, and records the time point. The PCRF uses a time period from the time point at which the request message is received to the time point at which the QoS control information is updated, as a time period for randomly generating time for the PCEF to reacquire QoS control information from the PCRF. In the time period, the PCRF can generate a random time point according to a random algorithm.

It should be noted that, the random algorithm may be any random algorithm in the prior art, for example, a random algorithm, a Las Vegas random algorithm, a Monte Carlo random algorithm, and a Sherwood random algorithm.

Step 103: The PCEF determines that the time for reacquiring QoS control information from the PCRF arrives, and sends the request message for reacquiring QoS control information to the PCRF.

In this embodiment of the present invention, the PCEF can determine, according to system time of the PCEF, whether the time for reacquiring QoS control information from the PCRF arrives. If it arrives, the PCEF sends the request message for reacquiring QoS control information to the PCRF, so as to reacquire the QoS control information from the PCRF, update original QoS control information, and further execute a new QoS control policy, thereby implementing diversified QoS service.

In this embodiment of the present invention, the PCRF determines, according to a random algorithm, any time point in a time period from the receiving time of the request message sent by the PCEF for acquiring QoS control information to the update time of the QoS control information, as the time for the PCEF to reacquire the QoS control information from the PCRF; and the PCEF reacquires the QoS control information from the PCRF according to the time for reacquiring QoS control information from the PCRF that is carried in the response message returned by the PCRF, thereby avoiding execution of a QoS update by multiple PCEFs at a same time point, avoiding update message congestion, and improving an update speed of the QoS.

Method Embodiment 2

Figure 3:
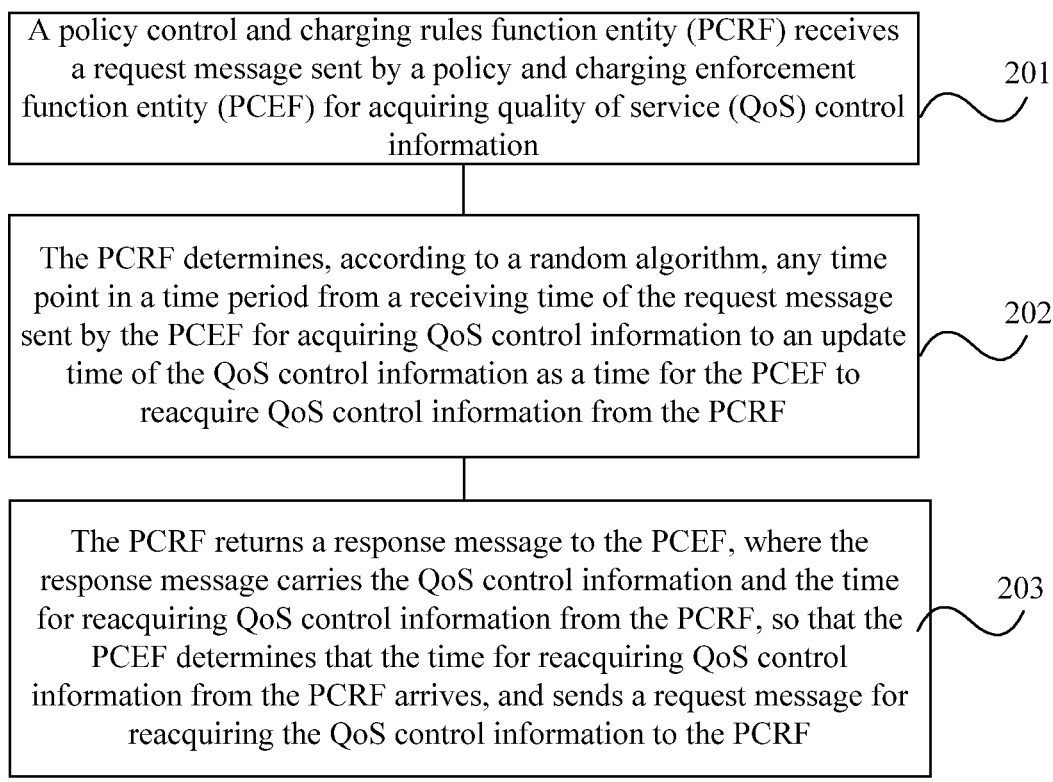
FIG. 3 is a schematic flowchart of a method for acquiring QoS control information according to another embodiment of the present invention.

FIG. 3 is a schematic flowchart of a method for acquiring QoS control information according to another embodiment of the present invention. As shown in FIG. 3, the method includes:

Step 201: A PCRF receives a request message sent by a PCEF for acquiring QoS control information.

In this embodiment of the present invention, the PCEF sends the request message for acquiring QoS control information to the PCRF, where the request message carries a user identity, and the user identity is used by the PCRF to determine QoS control information.

Specifically, the PCRF determines, according to the user identity, a user package subscribed to by a user, and generates the QoS control information according to the user package subscribed to by the user.

In this embodiment of the present invention, the PCRF pre-stores a user package, and the user package can provide the QoS control information for multiple users at the same time.

Specifically, the user package pre-stored by the PCRF may be acquired from an SPR. The SPR stores user information and user subscription information configured by an operator for each user. The SPR transfers the pre-configured user information and user subscription information to the PCRF through a Sp interface. The PCRF may generate a user package based on the information, and the PCRF can provide different service policies for different users based on the user package.

Step 202: The PCRF determines, according to a random algorithm, any time point in a time period from a receiving time of the request message sent by the PCEF for acquiring QoS control information to an update time of the QoS control information, as a time for the PCEF to reacquire QoS control information from the PCRF.

A manner in which the PCRF determines, according to the random algorithm, any time point in a time period from the receiving time of the request message sent by the PCEF for acquiring QoS control information to the update time of the QoS control information, as the time for the PCEF to reacquire QoS control information from the PCRF is described with respect to FIG. 2. Therefore, details are not repeated in this embodiment.

Step 203: The PCRF returns a response message to the PCEF, where the response message carries the QoS control information and the time for reacquiring QoS control information from the PCRF, so that the PCEF determines that the time for reacquiring QoS control information from the PCRF arrives, and sends a request message for reacquiring QoS control information to the PCRF.

In this embodiment of the present invention, the PCEF can determine, according to system time of the PCEF, whether the time for reacquiring QoS control information from the PCRF arrives. If it arrives, the PCEF sends the request message for reacquiring QoS control information to the PCRF, so as to reacquire the QoS control information from the PCRF, update original QoS control information, and further execute a new QoS control policy, thereby implementing diversified QoS service.

In this embodiment of the present invention, the PCRF determines, according to a random algorithm, any time point in a time period from the receiving time of the request message sent by the PCEF for acquiring QoS control information to the update time of the QoS control information, as the time for the PCEF to reacquire the QoS control information from the PCRF; and the PCEF reacquires the QoS control information from the PCRF according to the time for reacquiring QoS control information from the PCRF that is carried in the response message returned by the PCRF, thereby avoiding execution of a QoS update by multiple PCEFs at a same time point, avoiding update message congestion, and improving an update speed of the QoS.

Method Embodiment 3

Figure 4:
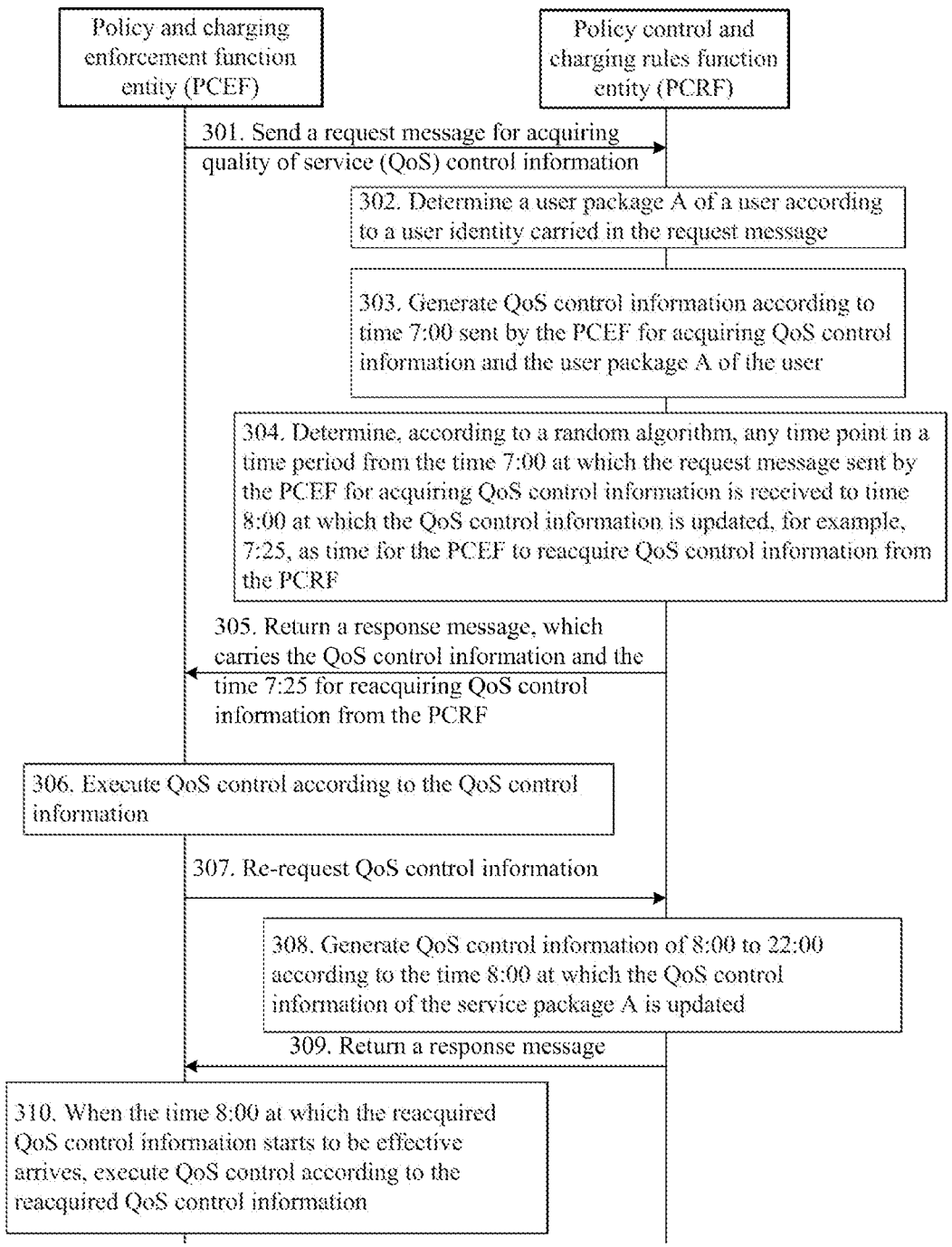
FIG. 4 is a schematic flowchart of a method for acquiring QoS control information according to another embodiment of the present invention.

FIG. 4 is a schematic flowchart of a method for acquiring QoS control information according to another embodiment of the present invention. In this embodiment of the present invention, a user subscribes to a user package A. The user package A provides a bandwidth of 512 kilobits-per-second (Kbps) from 8:00 to 22:00, and a bandwidth of 1 megabit-per-second (Mbps) from 22:00 to 8:00. This embodiment of the present invention is described by using an example where a PCEF needs to update QoS control information of the user package A of the user at 8:00 and 22:00. The PCEF communicates with a PCRF by using the Diameter protocol. As shown in FIG. 4, the method includes:

Step 301: The PCEF sends, at 7:00, a request message for acquiring QoS control information to the PCRF, where the request message carries a user identity.

In this embodiment of the present invention, the user gets online at 7:00, and triggers the PCEF to acquire, at 7:00, the QoS control information from the PCRF, where the PCEF may send a credit control request (CCR) message CCR-Initial to the PCRF through a Gx interface, to acquire the QoS control information.

It should be noted that, in this embodiment of the present invention, the user identity is used by the PCRF to determine an identity of the user, wherein the user identity may be a mobile user, the user identity may be a mobile phone number, or the user identity may be an electronic mail (e-mail) address for a fixed line user. In addition, the user identity may also be another identifier that can be used by the PCRF to determine the identity of the user. In this embodiment of the present invention, a specific implementation manner of the user identity is not limited.

Step 302: The PCRF determines the user package A of the user according to the user identity carried in the request message.

Specifically, the PCRF can determine the user package A of the user according to a correspondence between a pre-stored user identity and the user package A subscribed to by the user.

Step 303: The PCRF generates the QoS control information according to time, that is, 7:00, sent by the PCEF for acquiring QoS control information and the user package A of the user.

In this embodiment of the present invention, the user package A provides the bandwidth of 1 Mbps from 22:00 to 8:00. Therefore, a bandwidth parameter carried by the PCRF in the generated QoS control information is 1 Mbps.

Step 304: The PCRF determines, according to a random algorithm, any time point in a time period from the time 7:00 at which the request message sent by the PCEF for acquiring QoS control information is received to the time 8:00 at which the QoS control information is updated, for example, 7:25, as time for the PCEF to reacquire the QoS control information from the PCRF.

Specifically, when receiving the request message sent by the PCEF for acquiring QoS control information, the PCRF records the time point 7:00 at which the request message is received. The PCRF queries, according to the user identity carried in the request message, the user package A subscribed to by the user, determines the update time 8:00 of the QoS control information according to update time of QoS control information of the user package A, and records the time point. The PCRF uses a time period from the time point 7:00 at which the request message is received to the time point 8:00 at which the QoS control information is updated, as the time period for randomly generating time for the PCEF to reacquire the QoS control information from the PCRF. In the time period, the PCRF can generate a random time point according to a random algorithm. For example, the generated random time point is 7:25.

It should be noted that, the random algorithm may be any random algorithm in the prior art, for example, a random algorithm (Random), a Las Vegas random algorithm (Las Vegas Algorithms), a Monte Carlo random algorithm (Monte Carlo), and a Sherwood random algorithm (Sherwood).

Step 305: The PCRF returns a response message to the PCEF, where the response message carries the QoS control information and the time 7:25 for reacquiring QoS control information from the PCRF.

In this embodiment of the present invention, the PCRF can deliver the QoS control information to the PCEF by using a credit control answer (CCA) message CCA-Initial.

It should be noted that, if the PCRF delivers, through the Gx interface, the time 7:25 for reacquiring the QoS control information from the PCRF, an attribute value pairs (AVP) group, for example, a [QoS_Revalidation-Time] group, may be added to the Gx interface under a [Charging-Rule-Install] AVP group, where the [QoS_Revalidation-Time] group carries the time 7:25 for the PCEF to reacquire the QoS control information from the PCRF.

Step 306: The PCEF executes QoS control according to the QoS control information.

Specifically, the PCEF sets a bandwidth for network access of the user to 1 Mbps according to the bandwidth parameter 1 Mbps carried in the QoS control information.

Step 307: The PCEF re-requests QoS control information from the PCRF when detecting that the time 7:25 for re-requesting QoS control information from the PCRF arrives.

Specifically, the PCEF determines, according to system time of the PCEF, whether the time 7:25 for re-requesting QoS control information from the PCRF arrives; and if it arrives, the PCEF sends a request message for requesting QoS control information to the PCRF.

Step 308: The PCRF generates the QoS control information of 8:00 to 22:00 according to the time 8:00 at which the QoS control information of the service package A is updated.

In this embodiment of the present invention, the user package A provides the bandwidth of 512 Kbps from 8:00 to 22:00. Therefore, the bandwidth parameter carried in the generated QoS control information is 512 Kbps.

In addition, in this embodiment of the present invention, the PCRF further generates, according to the time 8:00 at which the QoS control information of the service package A is updated, validation time for executing the QoS control information. In this embodiment of the present invention, the validation time for executing the QoS control information is the update time 8:00 of the QoS control information.

Step 309: The PCRF returns a response message to the PCEF, where the response message carries reacquired QoS control information and the time 8:00 at which the reacquired QoS control information starts to be effective.

Step 310: When the time 8:00 at which the reacquired QoS control information starts to be effective arrives, the PCEF executes QoS control according to the reacquired QoS control information.

Specifically, the PCEF determines, according to system time of the PCEF, whether the time 8:00 for executing the QoS control information arrives; and if it arrives, the PCEF sets a bandwidth for network access of the user to 512 Kbps according to the bandwidth parameter 512 Kbps carried in the QoS control information.

In this embodiment of the present invention, the PCRF determines, according to a random algorithm, any time point in a time period from the receiving time of the request message sent by the PCEF for acquiring QoS control information to the update time of the QoS control information, as the time for the PCEF to reacquire the QoS control information from the PCRF; and the PCEF reacquires the QoS control information from the PCRF according to the time for reacquiring QoS control information from the PCRF that is carried in the response message returned by the PCRF, thereby avoiding execution of a QoS update by multiple PCEFs at a same time point, avoiding update message congestion, and improving an update speed of the QoS.

Method Embodiment 4

Figure 5:
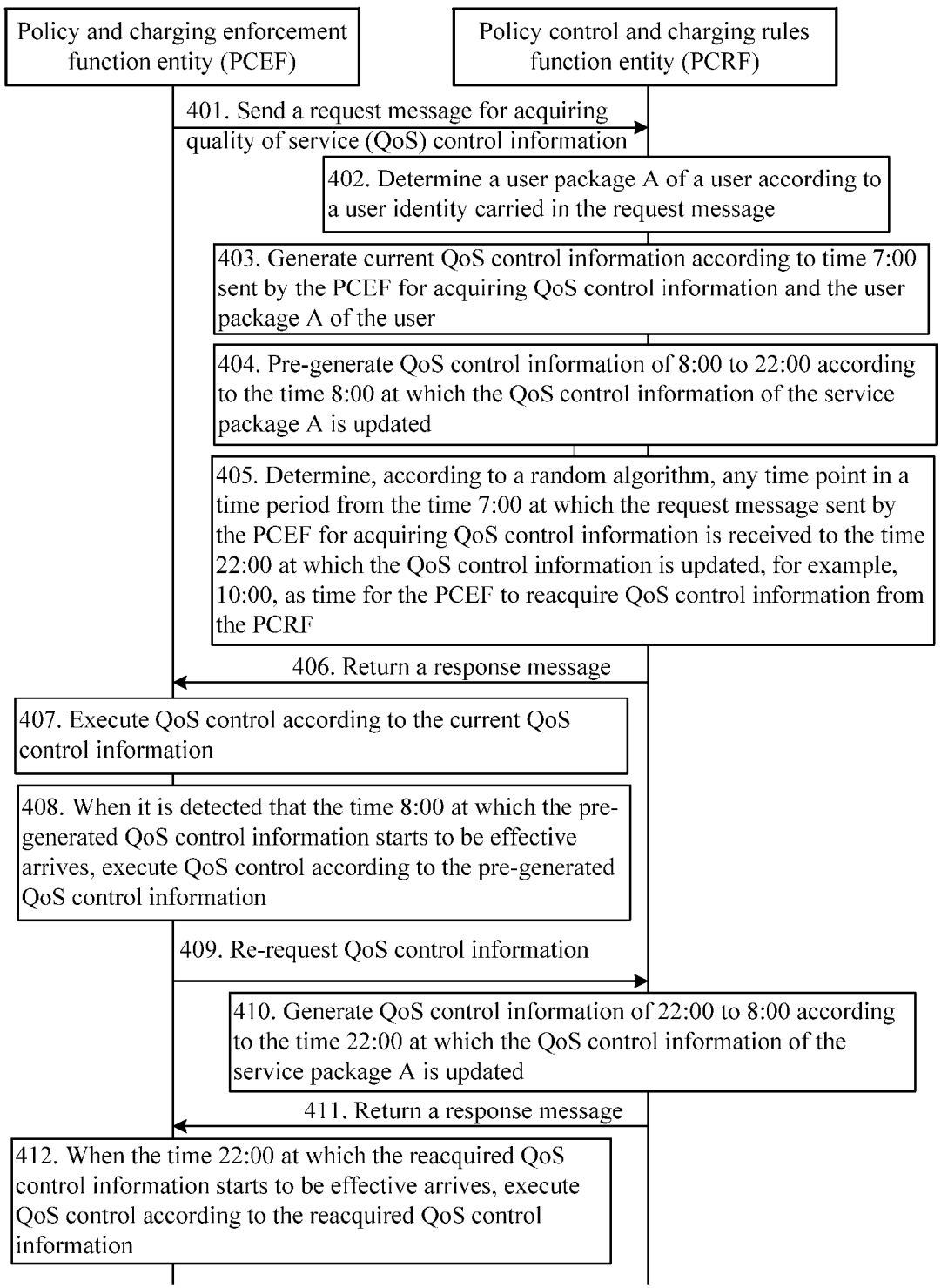
FIG. 5 is a schematic flowchart of a method for acquiring QoS control information according to another embodiment of the present invention.

FIG. 5 is a schematic flowchart of a method for acquiring QoS control information according to another embodiment of the present invention. In this embodiment of the present invention, a user subscribes to a user package A. The user package A provides a bandwidth of 512 Kbps from 8:00 to 22:00, and a bandwidth of 1 Mbps from 22:00 to 8:00. This embodiment of the present invention is described by using an example where a PCEF needs to update QoS control information of the user package A of the user at 8:00 and 22:00. The PCEF communicates with a PCRF by using the Diameter protocol. As shown in FIG. 5, the method includes:

Step 401: The PCEF sends, at 7:00, a request message for acquiring QoS control information to the PCRF, where the request message carries a user identity.

In this embodiment of the present invention, the user gets online at 7:00, and triggers the PCEF to acquire, at 7:00, the QoS control information from the PCRF, where the PCEF may send a credit control request message CCR-Initial to the PCRF through a Gx interface, to acquire the QoS control information.

It should be noted that, in this embodiment of the present invention, the user identity is used by the PCRF to determine an identity of the user, where the user identity may be a mobile phone number for a mobile user, the user identity may be an e-mail address for a fixed line user, in addition, the user identity may also be another identifier that can be used by the PCRF to determine the identity of the user. In this embodiment of the present invention, a specific implementation manner of the user identity is not limited.

Step 402: The PCRF determines the user package A of the user according to the user identity carried in the request message.

Specifically, the PCRF can determine the user package A of the user according to a correspondence between a pre-stored user identity and the user package A subscribed to by the user.

Step 403: The PCRF generates current QoS control information according to time, that is, 7:00, sent by the PCEF for acquiring QoS control information and the user package A of the user.

In this embodiment of the present invention, the user package A provides the bandwidth of 1 Mbps from 22:00 to 8:00. Therefore, a bandwidth parameter carried in the current QoS control information at 7:00 that is generated by the PCRF is 1 Mbps.

Step 404: The PCRF pre-generates QoS control information of 8:00 to 22:00 according to the time 8:00 at which the QoS control information of the service package A is updated.

In this embodiment of the present invention, the user package A provides the bandwidth of 512 Kbps from 8:00 to 22:00. Therefore, a bandwidth parameter carried in the pre-generated QoS control information is 512 Kbps.

Step 405: The PCRF determines, according to a random algorithm, any time point in a time period from the time 7:00 at which the request message sent by the PCEF for acquiring QoS control information is received to the time 22:00 at which the QoS control information is updated, for example, 10:00, as time for the PCEF to reacquire the QoS control information from the PCRF.

Specifically, when receiving the request message sent by the PCEF for acquiring QoS control information, the PCRF records the time point 7:00 at which the request message is received. The PCRF queries, according to the user identity carried in the request message, the user package A subscribed to by the user. After the QoS control information of 8:00 to 22:00 is pre-generated, update time of the QoS control information of the user package A is 22:00. The PCRF records the time point, and the PCRF uses a time period from the time point 7:00 at which the request message is received to the time point 22:00 at which the QoS control information is updated, as the time period for randomly generating time for the PCEF to reacquire the QoS control information from the PCRF. In the time period, the PCRF can generate a random time point according to a random algorithm. For example, the generated random time point is 10:00.

In addition, in this embodiment of the present invention, the PCRF further generates validation time for executing the pre-generated QoS control information according to the update time 8:00 of the QoS control information of the service package A. In this embodiment of the present invention, the validation time for executing the QoS control information is the update time 8:00 of the QoS control information.

Step 406: The PCRF returns a response message to the PCEF, where the response message carries the current QoS control information, the pre-generated QoS control information, the time 8:00 at which the pre-generated QoS control information starts to be effective, and the time 10:00 for reacquiring the QoS control information from the PCRF.

In this embodiment of the present invention, the PCRF can deliver the QoS control information to the PCEF by using a CCA-Initial.

It should be noted that, if the PCRF delivers, through the Gx interface, the time 10:00 for reacquiring the QoS control information from the PCRF, an AVP group, for example, a [QoS_Revalidation-Time] group, may be added to the Gx interface under a [Charging-Rule-Install] AVP group, where the [QoS_Revalidation-Time] group carries the time 10:00 for the PCEF to reacquire the QoS control information from the PCRF.

In addition, it is necessary to add another AVP group, for example, a [Pre-QoS-Information] group, to the Gx interface under the [Charging-Rule-Install] AVP group to deliver the pre-generated QoS control information.

In addition, it should also be noted that, the PCRF can deliver the time 8:00 at which the pre-generated QoS control information starts to be effective to the PCEF by using an existing [Revalidation-Time] group of the Gx interface.

Step 407: The PCEF executes QoS control according to the current QoS control information.

Specifically, the PCEF sets a bandwidth for network access of the user to 1 Mbps according to the bandwidth parameter 1 Mbps carried in the current QoS control information.

Step 408: When the PCEF detects that the time 8:00 at which the pre-generated QoS control information starts to be effective arrives, the PCEF executes the QoS control according to the pre-generated QoS control information.

Specifically, when detecting that the time 8:00 at which the pre-generated QoS control information starts to be effective arrives, the PCEF sets a bandwidth for network access of the user to 512 Kbps according to the bandwidth parameter 512 Kbps carried in the current QoS control information.

Step 409: The PCEF re-requests QoS control information from the PCRF when detecting that the time 10:00 for re-requesting QoS control information from the PCRF arrives.

Specifically, the PCEF determines, according to system time of the PCEF, whether the time 10:00 for re-requesting QoS control information from the PCRF arrives; and if it arrives, the PCEF sends a request message for requesting QoS control information to the PCRF.

Step 410: The PCRF generates the QoS control information of 22:00 to 8:00 according to the time 22:00 at which the QoS control information of the service package A is updated.

In this embodiment of the present invention, the user package A provides the bandwidth of 1 Mbps from 22:00 to 8:00. Therefore, the bandwidth parameter carried in the generated QoS control information is 1 Mbps.

In addition, in this embodiment of the present invention, the PCRF further generates validation time for executing the QoS control information, according to the time 22:00 at which the QoS control information of the service package A is updated, a time when the QoS control information starts to be effective. In this embodiment of the present invention, the validation time for executing the QoS control information starts to be effective is the time 22:00 at which the QoS control information is updated.

Step 411: The PCRF returns a response message to the PCEF, where the response message carries reacquired QoS control information and the time 22:00 at which the reacquired QoS control information starts to be effective.

Step 412: When the time 22:00 at which the reacquired QoS control information starts to be effective arrives, the PCEF executes QoS control according to the reacquired QoS control information.

Specifically, the PCEF determines, according to system time of the PCEF, whether the time 22:00 for executing the QoS control information arrives; and if it arrives, the PCEF sets a bandwidth for network access of the user to 1 Mbps according to the bandwidth parameter 1 Mbps carried in the QoS control information.

In this embodiment of the present invention, when determining the current QoS control information, the PCRF further determines the pre-generated QoS control information and the time when the pre-generated QoS control information starts to be effective, so that the time period from the receiving time of the request message sent by the PCEF for acquiring QoS control information to the update time of the QoS control information is largely extended; therefore, the PCRF determines, according to a random algorithm, any time point in a relatively long time period as the time for the PCEF to reacquire the QoS control information from the PCRF; and the PCEF reacquires the QoS control information from the PCRF according to the time for reacquiring QoS control information from the PCRF that is carried in the response message returned by the PCRF, thereby further avoiding execution of a QoS update by multiple PCFEs at a same time point, avoiding update message congestion, and improving an update speed of the QoS.

The following describes overall technical solutions of apparatus embodiments of the present invention.

Apparatus Embodiment 1

Figure 6:
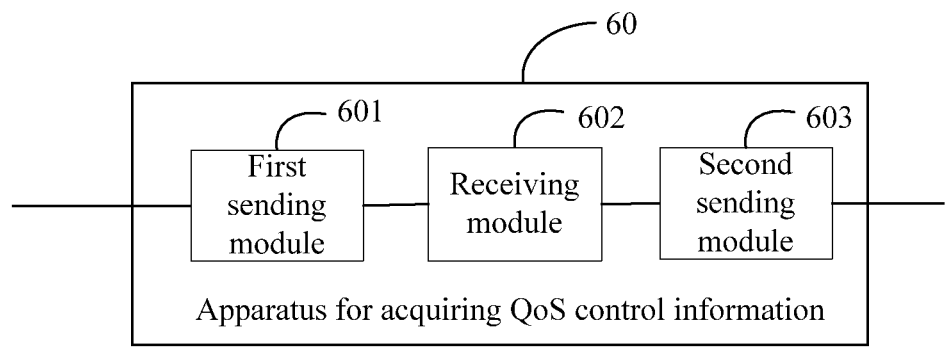
FIG. 6 is a schematic structural diagram of an apparatus for acquiring QoS control information according to an embodiment of the present invention.

FIG. 6 is a schematic structural diagram of an apparatus for acquiring QoS control information according to an embodiment of the present invention. As shown in FIG. 6, an apparatus 60 includes a first sending module 601, a receiving module 602, and a second sending module 603.

The first sending module 601 is configured to send a request message for acquiring QoS control information to a PCRF.

The receiving module 602 is configured to receive a response message returned by the PCRF, where the response message carries the QoS control information and a time for reacquiring QoS control information from the PCRF, and the time for reacquiring QoS control information from the PCRF is any time point that is determined by the PCRF according to a random algorithm and is in a time period from a receiving time of the request message sent by the PCEF for acquiring QoS control information to an update time of the QoS control information.

The second sending module 603 is configured to determine that the time for reacquiring QoS control information from the PCRF arrives, and send a request message for reacquiring QoS control information to the PCRF.

In this embodiment of the present invention, the PCRF determines, according to a random algorithm, any time point in a time period from the receiving time of the request message sent by the apparatus for acquiring QoS control information, for acquiring QoS control information to the update time of the QoS control information, as time for the apparatus for acquiring QoS control information to reacquire the QoS control information from the PCRF; and the apparatus for acquiring QoS control information reacquires QoS control information from the PCRF according to time for reacquiring QoS control information from the PCRF that is carried in the response message returned by the PCRF, thereby avoiding execution of a QoS update by multiple apparatuses for acquiring QoS control information at a same time point, avoiding update message congestion, and improving an update speed of the QoS.

Figure 7:
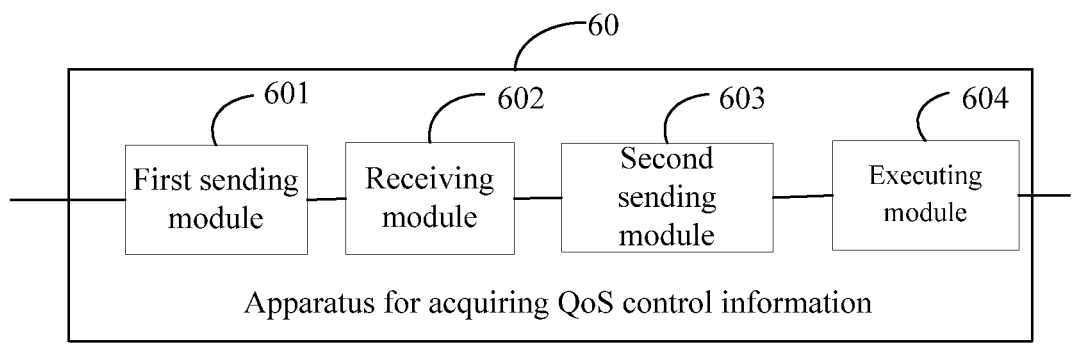
FIG. 7 is a schematic structural diagram of an apparatus for acquiring QoS control information according to another embodiment of the present invention.

Optionally, as shown in FIG. 7, in this embodiment of the present invention, the receiving module 602 is further configured to receive a response message returned by the PCRF, where the response message carries reacquired QoS control information and an effective time of the reacquired QoS control information. The apparatus 60 may further include an executing module 604, where the executing module 604 is configured to determine that the time when the reacquired QoS control information starts to be effective arrives, and execute QoS control according to the reacquired QoS control information.

Optionally, the receiving module 602 may be specifically configured to receive a response message returned by the PCRF, where the response message carries current QoS control information, pre-generated QoS control information, a time when the pre-generated QoS control information starts to be effective, and a time for reacquiring QoS control information from the PCRF. The executing module 604 is further configured to determine that the time when the pre-generated QoS control information starts to be effective arrives, and execute QoS control according to the pre-generated QoS control information; and is configured to determine that a time when the reacquired QoS control information starts to be effective arrives, and execute QoS control according to the reacquired QoS control information.

The receiving module 602 may be further configured to receive a response message returned by the PCRF, where the response message carries the reacquired QoS control information and the time when the reacquired QoS control information starts to be effective.

Apparatus Embodiment 2

Figure 8:
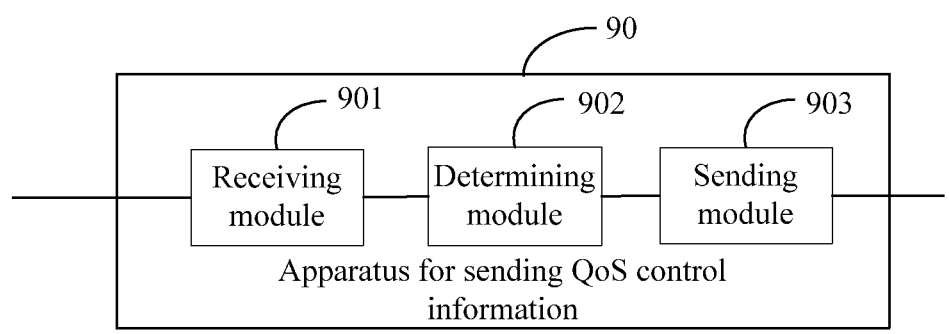
FIG. 8 is a schematic structural diagram of an apparatus for sending QoS control information according to an embodiment of the present invention.

FIG. 8 is a schematic structural diagram of an apparatus for sending QoS control information according to an embodiment of the present invention. As shown in FIG. 8, an apparatus 90 includes a receiving module 901, a determining module 902, and a sending module 903.

The receiving module 901 is configured to receive a request message sent by a policy and charging enforcement function entity PCEF for acquiring QoS control information.

The determining module 902 is configured to determine, according to a random algorithm, any time point in a time period from a receiving time of the request message sent by the PCEF for acquiring QoS control information to an update time of the QoS control information, as a time for the PCEF to reacquire QoS control information from the PCRF.

The sending module 903 is configured to return a response message to the PCEF, where the response message carries the QoS control information and the time for reacquiring QoS control information from the PCRF, so that the PCEF determines that the time for reacquiring QoS control information from the PCRF arrives, and sends a request message for reacquiring QoS control information to the PCRF.

In this embodiment of the present invention, the apparatus for sending QoS control information determines, according to a random algorithm, any time point in the time period from the receiving time of the request message sent by the PCEF for acquiring QoS control information to the update time of the QoS control information, as the time for the PCEF to reacquire the QoS control information from the apparatus for sending QoS control information; and the PCEF reacquires the QoS control information from the apparatus for sending QoS control information according to the time for reacquiring QoS control information from the apparatus for sending QoS control information that is carried in the response message returned by the apparatus for sending QoS control information, thereby avoiding execution of a QoS update by multiple PCEFs at a same time point, avoiding update message congestion, and improving an update speed of the QoS.

Optionally, in this embodiment of the present invention, the receiving module 901 may be specifically configured to receive the request message sent by the PCEF for acquiring QoS control information, where the request message sent by the PCEF for acquiring QoS control information further carries a user identity; and the determining module 902 is further configured to determine, according to the user identity, pre-generated QoS control information and a time when the pre-generated QoS control information starts to be effective.

Optionally, in this embodiment of the present invention, the receiving module 901 may be further configured to receive a request message sent by the PCEF for reacquiring QoS control information; and the sending module 903 may be further configured to return a response message to the PCEF, where the response message carries reacquired QoS control information and a time when the reacquired QoS control information starts to be effective, so that the PCEF determines that the time when the reacquired QoS control information starts to be effective arrives, and executes QoS control according to the reacquired QoS control information.

The following describes an overall technical solution of a system embodiment of the present invention.

Figure 9:
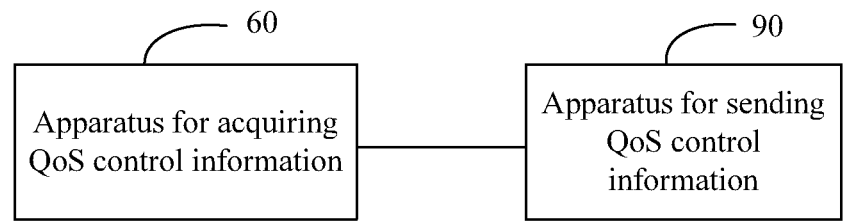
FIG. 9 is a schematic structural diagram of a system for acquiring QoS control information according to an embodiment of the present invention.

FIG. 9 is a schematic structural diagram of a system for acquiring QoS control information according to an embodiment of the present invention. As shown in FIG. 9, the system includes an apparatus 60 for acquiring QoS control information and an apparatus 90 for sending QoS control information.

The apparatus 60 for acquiring QoS control information is configured to send a request message for acquiring QoS control information to the apparatus 90 for sending QoS control information.

The apparatus 90 for sending QoS control information is configured to return a response message to the apparatus 60 for acquiring QoS control information, where the response message carries the QoS control information and a time for reacquiring QoS control information from the apparatus 90 for sending QoS control information, so that the apparatus 60 for acquiring QoS control information determines that the time for reacquiring QoS control information from the apparatus 90 for sending QoS control information arrives, and sends a request message for reacquiring QoS control information to the apparatus 90 for sending QoS control information.

In this embodiment of the present invention, the apparatus for sending QoS control information determines, according to a random algorithm, any time point in a time period from a receiving time of the request message sent by the apparatus for acquiring QoS control information, for acquiring QoS control information to an update time of the QoS control information, as a time for the apparatus for acquiring QoS control information to reacquire QoS control information from the apparatus for sending QoS control information; and the apparatus for acquiring QoS control information reacquires QoS control information from the apparatus for sending QoS control information according to the time for reacquiring QoS control information from the apparatus for sending QoS control information that is carried in the response message returned by the apparatus for sending QoS control information, thereby avoiding execution of a QoS update by multiple apparatuses for acquiring QoS control information at a same time point, avoiding update message congestion, and improving an update speed of the QoS.

In addition, it should also be noted that, the apparatus 90 for sending QoS control information is further configured to return a response message to the apparatus 60 for acquiring QoS control information, where the response message carries reacquired QoS control information and a time when the reacquired QoS control information starts to be effective, so that the apparatus 60 for acquiring QoS control information determines that the time when the reacquired QoS control information starts to be effective arrives, and executes QoS control according to the reacquired QoS control information.

Persons skilled in the art can clearly understand that, for ease and brevity of description, for a specific working process of the system, apparatuses, and modules described above, reference may be made to a corresponding process in the foregoing method embodiments, and details are not repeated herein.

In the several embodiments provided in the present application, it should be understood that the disclosed system, apparatuses, and methods may be implemented in other manners. For example, the apparatus embodiments described above are merely exemplary. For example, dividing of the modules or units is merely logical function dividing, and there may be other dividing manners in actual implementation. For example, a plurality of units or modules may be combined or integrated into another system, or some features may be ignored or not executed. In addition, the shown or discussed mutual coupling, direct coupling, or communication connection is implemented through some interfaces. The indirect coupling or communication connection of the apparatuses, modules, or units may be implemented electrical, mechanical, or in other forms.

Modules or units described as separate parts may or may not be physically separated, and parts shown as modules or units may or may not be physical modules or units, that is, may be located in one position, or may be distributed on a plurality of network modules or units. A part or all of the modules or units may be selected according to actual demands to achieve the objectives of the solutions of the embodiments of the present invention.

In addition, functional modules or units in the embodiments of the present invention may be integrated into one processing module or unit, or each of the modules or units may exist alone physically, or two or more modules or units may be integrated into one module or unit. The integrated module or unit may be implemented in a form of hardware, or may also be implemented in a form of a software functional unit.

When the integrated module or unit is implemented in a form of a software functional module or unit and sold or used as an independent product, the integrated module or unit may be stored in a computer-readable storage medium. Based on such understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) to execute all or a part of steps of the methods described in the embodiments of the present invention. The foregoing storage medium includes: any medium that is capable of storing program code, such as a universal serial bus (USB) flash drive, a removable hard disk, a read-only memory (ROM), a random access memory (RAM), a magnetic disk, or an optical disc.

The foregoing description is merely specific implementation manners of the present invention, but is not intended to limit the protection scope of the present invention. Any equivalent modification or replacement readily figured out by persons skilled in the art within the technical scope of the present invention shall fall within the protection scope of the present invention. Therefore, the protection scope of the present invention shall be subject to the protection scope of the claims.

What is claimed is:

1. A method for acquiring quality of service (QoS) control information comprising:
   sending, by a border gateway device embedded with a policy and charging enforcement function entity (PCEF), a first request message for acquiring QoS control information and a time for reacquiring QoS control information to a device embedded with a policy control and charging rules function entity (PCRF);
   receiving, by the border gateway device embedded with the PCEF, a first response message returned by the device embedded with the PCRF, wherein the first response message carries the QoS control information and a time for reacquiring QoS control information from the device embedded with the PCRF, and wherein the time for reacquiring QoS control information from the device embedded with the PCRF is a time point, determined by the device embedded with the PCRF according to a random algorithm, in a time period from a receiving time of the first request message sent by the border gateway device embedded with the PCEF for acquiring QoS control information to an update time of the QoS control information;
   determining, by the border gateway device embedded with the PCEF, that the time for reacquiring QoS control information from the device embedded with the PCRF arrives, and sending a second request message for reacquiring QoS control information to the PCRF;
   receiving, by the border gateway device embedded with the PCEF, a second response message returned by the device embedded with the PCRF, wherein the second response message carries reacquired QoS control information and an effective time of the reacquired QoS control information;
   determining, by the border gateway device embedded with the PCEF, that the effective time of the reacquired QoS control information has been reached; and
   executing QoS control according to the reacquired QoS control information when the effective time of the reacquired QoS control information has been reached.

2. The method according to claim 1, wherein the first response message carries the QoS control information, and wherein the time for reacquiring QoS control information from the device embedded with the PCRF comprises carrying, in the first response message, current QoS control information, pre-generated QoS control information, a time when the pre-generated QoS control information starts to be effective, and the time for reacquiring QoS control information from the device embedded with the PCRF.

3. The method according to claim 2, wherein the method further comprises determining, by the border gateway device embedded with the PCEF, that the time when the pre-generated QoS control information starts to be effective arrives, and executing QoS control according to the pre-generated QoS control information.

4. The method according to claim 1, wherein the first request message sent by the border gateway device embedded with the PCEF for acquiring QoS control information to the device embedded with the PCRF is a credit control request message (CCR-Initial), wherein the first response message returned by the device embedded with the PCRF and the second response message received by the border gateway device embedded with the PCEF is a credit control answer message (CCA-Initial), and wherein the second request message sent to the device embedded with the PCRF for reacquiring QoS control information is a credit control request message (CCR-Update).

5. A method for acquiring quality of service (QoS) control information, comprising:
   receiving, by a device embedded with a policy control and charging rules function entity (PCRF), a first request message sent by a border gateway device embedded with a policy and charging enforcement function entity (PCEF) for acquiring QoS control information and a time for reacquiring QoS control information;
   determining, by the device embedded with the PCRF according to a random algorithm, a time point in a time period from a receiving time of the first request message sent by the border gateway device embedded with the PCEF for acquiring QoS control information to an update time of the QoS control information, as a time for the border gateway device embedded with the PCEF to reacquire QoS control information from the device embedded with the PCRF;
   returning, by the device embedded with the PCRF, a first response message to the border gateway device embedded with the PCEF, wherein the first response message carries the QoS control information and the time for reacquiring QoS control information from the device embedded with the PCRF so that the border gateway device embedded with the PCEF determines that the time for reacquiring QoS control information from the device embedded with the PCRF arrives and sends a second request message for reacquiring QoS control information to the device embedded with the PCRF;
   receiving, by the device embedded with the PCRF, the second request message sent by the border gateway device embedded with the PCEF for reacquiring QoS control information; and
   returning, by the device embedded with the PCRF, a second response message to the border gateway device embedded with the PCEF, wherein the second response message carries reacquired QoS control information and a time when the reacquired QoS control information starts to be effective so that the border gateway device embedded with the PCEF determines that the effective time of the reacquired QoS control information has been reached and executes QoS control according to the reacquired QoS control information when the effective time of the reacquired QoS control information has been reached.

6. The method according to claim 5, wherein the method further comprises:
carrying, in the first request message sent by the border gateway device embedded with the PCEF for acquiring QoS control information, a user identity;
determining, by the device embedded with the PCRF according to the user identity, pre-generated QoS control information and a time when the pre-generated QoS control information starts to be effective; and
carrying, in the first response message returned by the device embedded with the PCRF to the border gateway device embedded with the PCEF, the pre-generated QoS control information and the time when the pre-generated QoS control information starts to be effective so that the border gateway device embedded with the PCEF determines that the time when the pre-generated QoS control information starts to be effective arrives and executes QoS control according to the pre-generated QoS control information.

7. The method according to claim 6, wherein determining by the device embedded with the PCRF according to the user identity, pre-generated QoS control information and the time when the pre-generated QoS control information starts to be effective comprises:
determining, by the device embedded with the PCRF according to the user identity, a user package subscribed to by a user; and
generating, by the device embedded with the PCRF according to an update time of QoS control information of the user package, the pre-generated QoS control information and the time when the pre-generated QoS control information starts to be effective.

8. A border gateway device embedded with a policy control and charging enforcement function entity (PCEF) comprising:
a memory configured to store program code;
at least one computer processor coupled to the memory and configured to execute the program code, wherein executing the program code causes the computer processor to:
send a first request message for acquiring QoS control information and a time for reacquiring QoS control information to a device embedded with a policy control and charging rules function entity (PCRF);
receive a first response message returned by the device embedded with the PCRF, wherein the first response message carries the QoS control information and a time for reacquiring QoS control information from the device embedded with the PCRF, and wherein the time for reacquiring QoS control information from the device embedded with the PCRF is a time point, determined by the device embedded with the PCRF according to a random algorithm, in a time period from a receiving time of the first request message sent by the border gateway device embedded with the PCEF for acquiring QoS control information to an update time of the QoS control information;
determine that the time for reacquiring QoS control information from the device embedded with the PCRF arrives, and sending a second request message for reacquiring QoS control information to the device embedded with the PCRF;
receive a second response message returned by the device embedded with the PCRF, wherein the second response message carries reacquired QoS control information and an effective time of the reacquired QoS control information;
determine that the effective time of the reacquired QoS control information has been reached; and
execute QoS control according to the reacquired QoS control information when effective time of the reacquired QoS control information has been reached.

9. The border gateway device embedded with the PCEF according to claim 8, wherein the first response message carries the QoS control information, and wherein the time for reacquiring QoS control information from the device embedded with the PCRF comprises carrying, in the first response message, current QoS control information, pre-generated QoS control information, a time when the pre-generated QoS control information starts to be effective, and the time for reacquiring QoS control information from the device embedded with the PCRF.

10. The border gateway device embedded with the PCEF according to claim 9, wherein the computer processor is further configured to:
determine that the time when the pre-generated QoS control information starts to be effective arrives; and
execute QoS control according to the pre-generated QoS control information.

11. The border gateway device embedded with the PCEF according to claim 8, wherein the first request message sent by the border gateway device embedded with the PCEF for acquiring QoS control information to the device embedded with the PCRF is a credit control request message (CCR-Initial), wherein the first response message returned by the PCRF and the second response message received by the border gateway device embedded with the PCEF is a credit control answer message (CCA-Initial), and wherein the second request message sent to the device embedded with the PCRF for reacquiring QoS control information is a credit control request message (CCR-Update).

12. A device embedded with a policy control and charging rules function entity (PCRF) comprising:
a memory configured to store program code;
at least one computer processor coupled to the memory and configured to execute the program code, wherein executing the program code causes the computer processor to:
receive a first request message sent by a border gateway device embedded with a policy and charging enforcement function entity (PCEF) for acquiring QoS control information and a time for reacquiring QoS control information;
determine, according to a random algorithm, a time point in a time period from a receiving time of the first request message sent by the border gateway device embedded with the PCEF for acquiring QoS control information to an update time of the QoS control information, as a time for the border gateway device embedded with the PCEF to reacquire QoS control information from the device embedded with the PCRF;
return a first response message to the border gateway device embedded with the PCEF, wherein the first response message carries the QoS control information and the time for reacquiring QoS control information from the device embedded with the PCRF so that the border gateway device embedded with the PCEF determines that the time for reacquiring QoS control information from the device embedded with the PCRF arrives and sends a second request message for reacquiring QoS control information to the device embedded with the PCRF;

receive the second request message sent by the border gateway device embedded with the PCEF for reacquiring QoS control information; and return a second response message to the border gateway device embedded with the PCEF, wherein the second response message carries reacquired QoS control information and a time when the reacquired QoS control information starts to be effective so that the border gateway device embedded with the PCEF determines that the effective time of the reacquired QoS control information has been reached and executes QoS control according to the reacquired QoS control information when the effective time of the reacquired QoS control information has been reached.

13. The device embedded with the PCRF according to claim 12, wherein the computer processor is further configured to:

carry, in the first request message sent by the border gateway device embedded with the PCEF for acquiring QoS control information, a user identity;

determine pre-generated QoS control information and a time when the pre-generated QoS control information starts to be effective according to the user identity; and carry, in the first response message returned by the device embedded with the PCRF to the border gateway device embedded with the PCEF, the pre-generated QoS control information and the time when the pre-generated QoS control information starts to be effective so that the border gateway device embedded with the PCEF determines that the time when the pre-generated QoS control information starts to be effective arrives and executes QoS control according to the pre-generated QoS control information.

14. The device embedded with the PCRF according to claim 13, wherein determining pre-generated QoS control information and the time when the pre-generated QoS control information starts to be effective comprises:

determining a user package subscribed to by a user according to the user identity; and generating, according to an update time of QoS control information of the user package, the pre-generated QoS control information and the time when the pre-generated QoS control information starts to be effective.

* * * * *